US 11,668,233 B2

(12) United States Patent
Sarder et al.

(10) Patent No.: US 11,668,233 B2
(45) Date of Patent: Jun. 6, 2023

(54) BACKPLATE FOR ENGINE-ALTERNATOR COUPLING IN STANDBY GENERATOR

(71) Applicant: Champion Power Equipment, Inc., Santa Fe Springs, CA (US)

(72) Inventors: Mark J. Sarder, Waukesha, WI (US); Russell J. Dopke, Elkhart Lake, WI (US); Hiroaki Sato, Brookfield, WI (US); Leigh A. Jenison, Hartland, WI (US)

(73) Assignee: Champion Power Equipment, Inc., Santa Fe Springs, CA (US)

(*) Notice: Subject to any disclaimer, the term of this patent is extended or adjusted under 35 U.S.C. 154(b) by 0 days.

(21) Appl. No.: 17/448,245

(22) Filed: Sep. 21, 2021

(65) Prior Publication Data
US 2022/0003157 A1 Jan. 6, 2022

Related U.S. Application Data

(63) Continuation of application No. 16/357,479, filed on Mar. 19, 2019, now Pat. No. 11,143,099.
(Continued)

(51) Int. Cl.
F02B 63/04 (2006.01)
H02K 7/18 (2006.01)
(Continued)

(52) U.S. Cl.
CPC ............ F02B 63/044 (2013.01); F01P 11/10 (2013.01); F02B 63/042 (2013.01); F02B 67/04 (2013.01);
(Continued)

(58) Field of Classification Search
CPC ... F01P 11/10; F02B 2063/045; F02B 63/042; F02B 63/044; F02B 67/04; F02B 67/06; F02N 11/00; H02K 7/1815
See application file for complete search history.

(56) References Cited

U.S. PATENT DOCUMENTS 2,240,664 A 5/1941 Moore
4,134,370 A 1/1979 Iwahashi et al.
(Continued)

FOREIGN PATENT DOCUMENTS

CN 1800600 A 7/2006
CN 2890369 Y 4/2007
(Continued)

Primary Examiner — George C Jin
Assistant Examiner — Teuta B Holbrook
(74) Attorney, Agent, or Firm — Ziolkowski Patent Solutions Group, SC

(57) ABSTRACT

An engine assembly is provided that includes an engine having a crankshaft that is caused to rotate response to a firing of the engine, a backplate affixed to the engine and comprising one or more air flow passages formed therethrough, and an engine cooling fan operatively coupled to the crankshaft so as to be rotated by the crankshaft, the engine cooling fan coupled to the crankshaft on a side of the backplate opposite the engine. The engine assembly also includes a fan cover mounted over the engine cooling fan and secured to the backplate, the fan cover including an opening through which an air flow is provided to the engine cooling. The backplate and the fan cover collectively form an air guide that directs a flow of cooling air generated by the engine cooling fan through the one or more air flow passages of the backplate and to the engine.

5 Claims, 8 Drawing Sheets

Related U.S. Application Data

(60) Provisional application No. 62/685,399, filed on Jun. 15, 2018.

(51) Int. Cl.
*F01P 11/10* (2006.01)
*F02N 11/00* (2006.01)
*F02B 67/06* (2006.01)
*F02B 67/04* (2006.01)

(52) U.S. Cl.
CPC .............. *F02B 67/06* (2013.01); *F02N 11/00* (2013.01); *H02K 7/1815* (2013.01); *F02B 2063/045* (2013.01)

(56) References Cited

U.S. PATENT DOCUMENTS

| | | | |
|---|---|---|---|
| 4,608,946 A | 9/1986 | Tanaka et al. | |
| 4,692,123 A * | 9/1987 | Tada | F02B 75/16 123/195 P |
| 4,702,201 A | 10/1987 | Odo et al. | |
| 4,835,405 A | 5/1989 | Clancey et al. | |
| 5,742,108 A | 4/1998 | Kuribayashi et al. | |
| 5,813,384 A * | 9/1998 | Lavender | F02B 75/22 123/195 P |
| 5,899,174 A | 5/1999 | Anderson et al. | |
| 5,914,551 A | 6/1999 | Kern et al. | |
| 6,028,369 A | 2/2000 | Hirose et al. | |
| 6,039,009 A | 3/2000 | Hirose | |
| 6,331,740 B1 | 12/2001 | Morohoshi et al. | |
| 6,376,944 B1 | 4/2002 | Grizzle, Jr. et al. | |
| 6,489,690 B1 | 12/2002 | Hatsugai et al. | |
| 6,784,574 B2 | 8/2004 | Turner et al. | |
| 6,825,573 B2 | 11/2004 | Suzuki et al. | |
| 6,975,042 B2 | 12/2005 | Kamada et al. | |
| 7,314,397 B2 | 1/2008 | Sodemann et al. | |
| 7,537,070 B2 | 5/2009 | Maslov et al. | |
| 7,557,458 B2 | 7/2009 | Yamamoto et al. | |
| 7,642,665 B2 | 1/2010 | Konop et al. | |
| 8,178,985 B2 | 5/2012 | Hirose et al. | |
| 8,424,498 B2 | 4/2013 | Tiefenthaler et al. | |
| 8,544,575 B1 | 10/2013 | Scaringe et al. | |
| 8,899,191 B2 | 12/2014 | Yano et al. | |
| 9,617,951 B2 | 4/2017 | Sotiriades et al. | |
| 2001/0029906 A1 | 10/2001 | Suzuki | |
| 2002/0000342 A1 | 1/2002 | Yamada et al. | |
| 2005/0104461 A1 | 5/2005 | Hatz et al. | |
| 2005/0179261 A1 | 8/2005 | Hatz et al. | |
| 2005/0269886 A1 | 12/2005 | Harris | |
| 2006/0170295 A1 | 8/2006 | Allen | |
| 2006/0185628 A1* | 8/2006 | Akaike | F01P 5/08 123/41.7 |
| 2007/0029885 A1 | 2/2007 | Sakakibara | |
| 2008/0092833 A1 | 4/2008 | Tomoyasu | |
| 2009/0229544 A1* | 9/2009 | Hatsu | H02K 7/1815 123/41.56 |
| 2010/0077786 A1 | 4/2010 | Siegenthaler et al. | |
| 2010/0176603 A1 | 7/2010 | Bushnell et al. | |
| 2011/0272952 A1 | 11/2011 | Richardson et al. | |
| 2013/0187392 A1 | 7/2013 | Janscha et al. | |
| 2014/0261259 A1* | 9/2014 | Sullivan | F02F 7/007 123/41.65 |
| 2015/0087455 A1 | 3/2015 | Oh | |
| 2016/0233739 A1 | 8/2016 | Jenison et al. | |
| 2016/0281576 A1* | 9/2016 | Takahashi | F02B 63/04 |
| 2016/0294255 A1 | 10/2016 | Schmit et al. | |
| 2016/0319728 A1 | 11/2016 | Jenison et al. | |
| 2017/0045015 A1* | 2/2017 | Nishi | F01P 5/02 |
| 2017/0159600 A1* | 6/2017 | Cook | F01P 1/02 |
| 2017/0167353 A1 | 6/2017 | Pitcel et al. | |
| 2018/0145559 A1 | 5/2018 | Johnson et al. | |

FOREIGN PATENT DOCUMENTS

| | | | |
|---|---|---|---|
| CN | 101534033 A * | 9/2009 | .............. F02B 63/04 |
| CN | 204024810 U | 12/2014 | |
| CN | 104314676 A | 1/2015 | |
| WO | 8901567 A | 2/1989 | |
| WO | WO-8901567 A * | 2/1989 | .............. F02B 33/40 |

* cited by examiner

BACKPLATE FOR ENGINE-ALTERNATOR COUPLING IN STANDBY GENERATOR

CROSS-REFERENCE TO RELATED APPLICATION

The present application is a continuation of and claims priority to U.S. patent application Ser. No. 16/357,479, filed Mar. 19, 2019, which is a non-provisional of, and claims priority to, U.S. Provisional Patent Application Ser. No. 62/685,399, filed Jun. 15, 2018, the disclosures of which are incorporated herein by reference in their entirety.

BACKGROUND OF THE INVENTION

Embodiments of the invention relate generally to standby generators and, more particularly, to an engine backplate that provides for mounting of an alternator to an engine in a standby generator.

Standby generators provide a convenient source of electricity for use when outages occur in the utility grid. Some standby generators use an alternator driven by an internal combustion engine to produce electrical power for distribution to a home or building. The engine typically operates on fuel from a fuel tank located onsite or from a fuel line connected to the home or building. The fuel is combusted in one or more cylinders of the engine causing translational motion of a piston in each cylinder. The translational motion of each piston is converted into rotational motion by a crankshaft which is coupled to drive the alternator. The alternator produces electrical power that can be delivered to an electrical panel of the home or building.

In standby generators, the engine and the alternator are generally stored in a standby generator enclosure that may include one or more airflow openings to provide fresh air to the generator. The fresh air can be used for combustion within cylinders of the engine and to cool generator components within the enclosure. Exhaust fumes following combustion can be vented from the enclosure through an airflow opening, as can cooling air expelled from generator components. In some standby generators, the engine is cooled by an engine cooling fan that blows a stream a stream of cooling air across the engine to prevent the engine from overheating, with air being provided to the cooling fan through one of the airflow openings in the generator enclosure and being driven out of the enclosure through a different airflow opening after cooling the engine.

In typical standby generators, the alternator is mounted on or adjacent to the engine at a downstream location from the engine cooling fan. That is, the engine cooling fan is positioned on one side of the engine and blows a stream a stream of cooling air across the engine and then across the alternator that is positioned downstream from engine relative to the cooling fan. This arrangement of the engine cooling fan, engine and alternator results in heated air that has been blown off the engine then flowing directly over the alternator and other temperature critical generator components. While it would therefore be desirable to position the alternator at a location where it would not be subjected to heated air coming off of the engine and at which it would still be adequately cooled, it is recognized that such repositioning of the alternator requires considerations/accommodations regarding connection and mounting of the alternator relative to the engine—such as centering of the alternator relative to the engine and providing for adequate cooling of the alternator.

Therefore, it would be desirable to provide a standby generator having an air-cooled engine and alternator where the alternator is positioned to provide for more efficient cooling thereof. It would be further desirable to provide a mechanism for mounting the alternator to the engine in such an arrangement, with the mounting mechanism enabling such connection and mounting of the alternator relative to the engine.

BRIEF DESCRIPTION OF THE INVENTION

Embodiments of the invention are directed to an engine backplate that provides for mounting of an alternator to an engine in a standby generator.

In accordance with one aspect of the invention, an engine assembly includes an engine having a crankshaft that is caused to rotate response to a firing of the engine, a backplate affixed to the engine and comprising one or more air flow passages formed therethrough, and an engine cooling fan operatively coupled to the crankshaft so as to be rotated by the crankshaft, the engine cooling fan coupled to the crankshaft on a side of the backplate opposite the engine. The engine assembly also includes a fan cover mounted over the engine cooling fan and secured to the backplate, the fan cover including an opening through which an air flow is provided to the engine cooling. The backplate and the fan cover collectively form an air guide that directs a flow of cooling air generated by the engine cooling fan through the one or more air flow passages of the backplate and to the engine.

In accordance with another aspect of the invention, a backplate for an internal combustion engine includes a main section having an opening therein sized to receive an engine crankshaft therethrough, a pair of arms extending off from the main section and each having formed therein an air flow passage, and a plurality of bosses extending outwardly from the main section to provide mounting locations to the backplate, each boss including a threaded opening formed therein configured to receive a fastener.

In accordance with yet another aspect of the invention, a generator includes an engine, a backplate affixed to the engine, an alternator driven by the engine via a crankshaft extending from the engine to the alternator, and an alternator adaptor positioned between the engine and the alternator and affixed to the backplate. The backplate provides a structural support to connect the alternator to the engine, via the alternator adaptor.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

An operating environment of the invention is described here below with respect to a standby generator having an internal combustion engine and alternator arrangement for power generation and an associated cooling fan for cooling the engine. However, it will be appreciated by those skilled in the art that the invention is equally applicable for use with other electrical generators. While the invention will be described with respect to a standby generator having a multi-chamber generator enclosure, embodiments of the invention are equally applicable for use with single-chamber or other types of generator enclosures.

Figure 1:
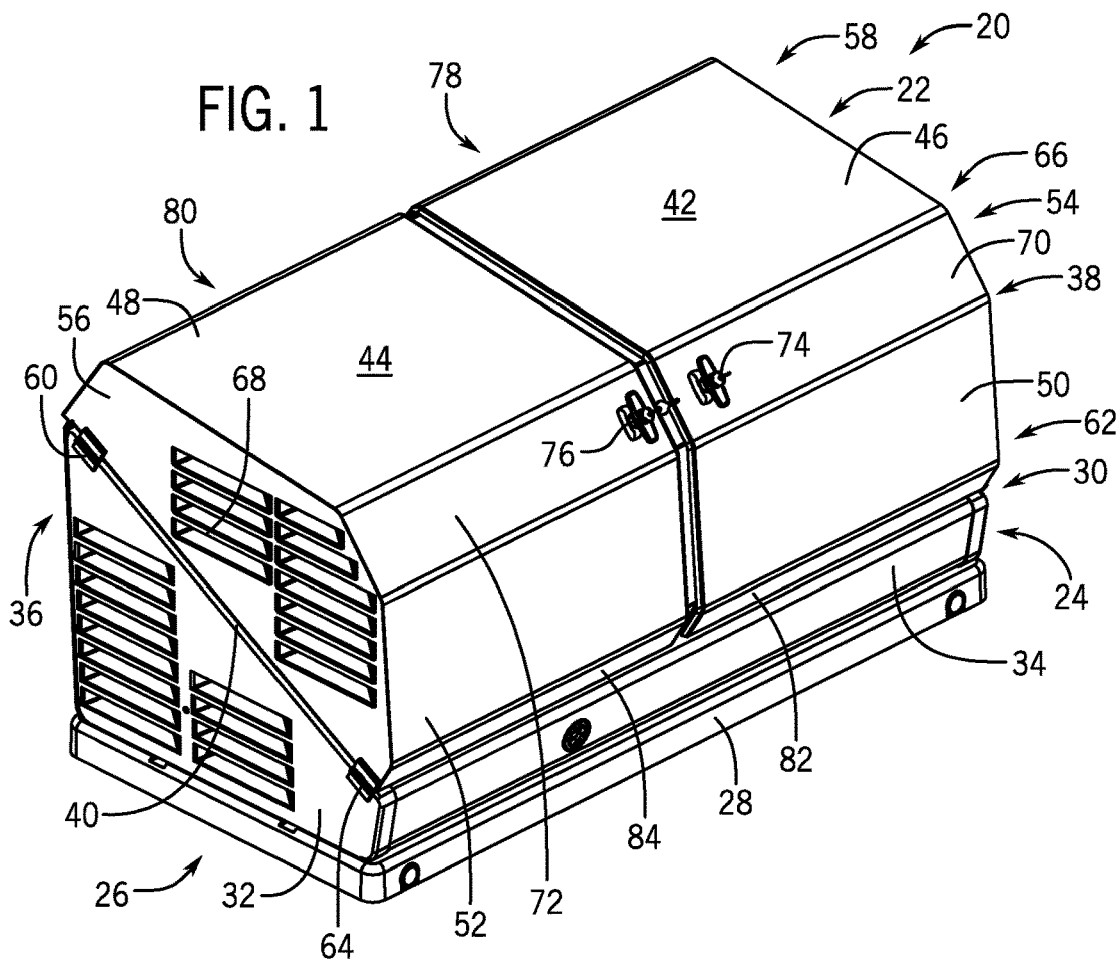
FIG. 1 is a perspective view from the left upper side of an electrical generator, according to an embodiment of the invention.

Referring to FIG. 1, a standby generator 20 is shown, in accordance with an embodiment of the invention. The standby generator 20 produces electrical energy and may deliver the electrical energy to a distribution panel of a home, office, shop, business or any other building requiring electricity. The standby generator 20 may include an internal combustion engine, an alternator driven by the internal combustion engine, and other associated components. The internal combustion engine operates on a fuel source that may include gasoline, diesel, liquefied petroleum gas (LPG), propane, butane, natural gas, or any other fuel source suitable for operating the engine. For instance, the internal combustion engine may comprise a single fuel engine configured to operate on one of the fuels. Alternatively, the engine may comprise a dual fuel or multi-fuel engine configured to switch operation between two or more of the fuel sources. In one embodiment, the engine may comprise a dual fuel engine configured to switch operation between LPG and gasoline, or LPG and diesel. The alternator and engine may form an engine-generator set used to produce electricity for distribution from the standby generator 20.

The standby generator 20 may include a standby generator enclosure 22 to house the engine-generator set and other associated components. In the embodiment of FIG. 1, the engine-generator set is positioned in a horizontal crankshaft arrangement with the alternator located toward a first end 24 of the enclosure 22 and the engine located toward a second end 26 of the enclosure 22. The standby generator enclosure 22 may include a base 28 to support the engine-generator set. The enclosure 22 may also have a first sidewall 30 and a second sidewall 32 each extending generally vertically from opposite ends of the base 28 at the first end 24 and the second end 26 of the enclosure 22, respectively. The enclosure 22 may also include a front wall 34 and a back wall 36 extending generally vertically from the base 28 between the first sidewall 30 and the second sidewall 32, with the front wall 34 and the back wall 36 defining a front and a back sidewall of the standby generator 20. The front wall 34 and the back wall 36 may be angled slightly from vertical such that each has a bottom portion positioned slightly inward from a corresponding top portion. The first sidewall 30 and the second sidewall 32 may each have a respective top edge 38, 40 that generally slopes diagonally from a taller back wall 36 to a shorter front wall 34.

The enclosure 22 may also include one or more hoods to cover the standby generator 20. The embodiment shown in FIG. 1 has a first hood 42 and a second hood 44, also referred to as doors, coupled to a respective first sidewall 30 and second sidewall 32. The first hood 42 and the second hood 44 may each have a top panel 46, 48, a front panel 50, 52, and a side panel 54, 56 with the side panels generally perpendicular to the respective top and front panels. The side panels 54, 56 of each hood 42, 44 may each be a coupled to a respective one of the first sidewall 30 and the second sidewall 32 of the enclosure 22 using a first hinge 58, 60 and a second hinge 62, 64. The side panels 54, 56 may include vents 66, 68 with louvers, and vents may be formed in the first sidewall 30 and the second sidewall 32. The top panels 46, 48 are preferably sloped downward toward the front of the enclosure 22 and the front panels 50, 52 may slope forward toward the base 28 of the enclosure 22 to enhance water runoff.

Each hood 42, 44 may also have a front transition panel 70, 72 between the respective top panel 46, 48 and the front panel 50, 52. The front transition panels 70, 72 further encourage water runoff and add to an aesthetically pleasing design. A handle 74, 76 may be attached to the front transition panel 70, 72 of each hood 42, 44 for opening the hoods and exposing internal components of the standby generator 20. The front transition panels 70, 72 are designed so the handles 74, 76 enhance accessibility by directionally facing a person standing in front of the enclosure 22 when the hoods 42, 44 are closed. Each hood 42, 44 may also have a rear transition panel 78, 80 that slopes downward from the respective top panel 46, 48 toward the back wall 36 when the hoods are closed. Each hood 42, 44 may also have a lower transition panel 82, 84 that slopes inward from the respective front panel 50, 52 toward the front wall 34 when the hoods are closed. The rear transition panels 78, 80 and the lower transition panels 82, 84 further encourage water runoff and add to an aesthetically pleasing design.

Figure 2:
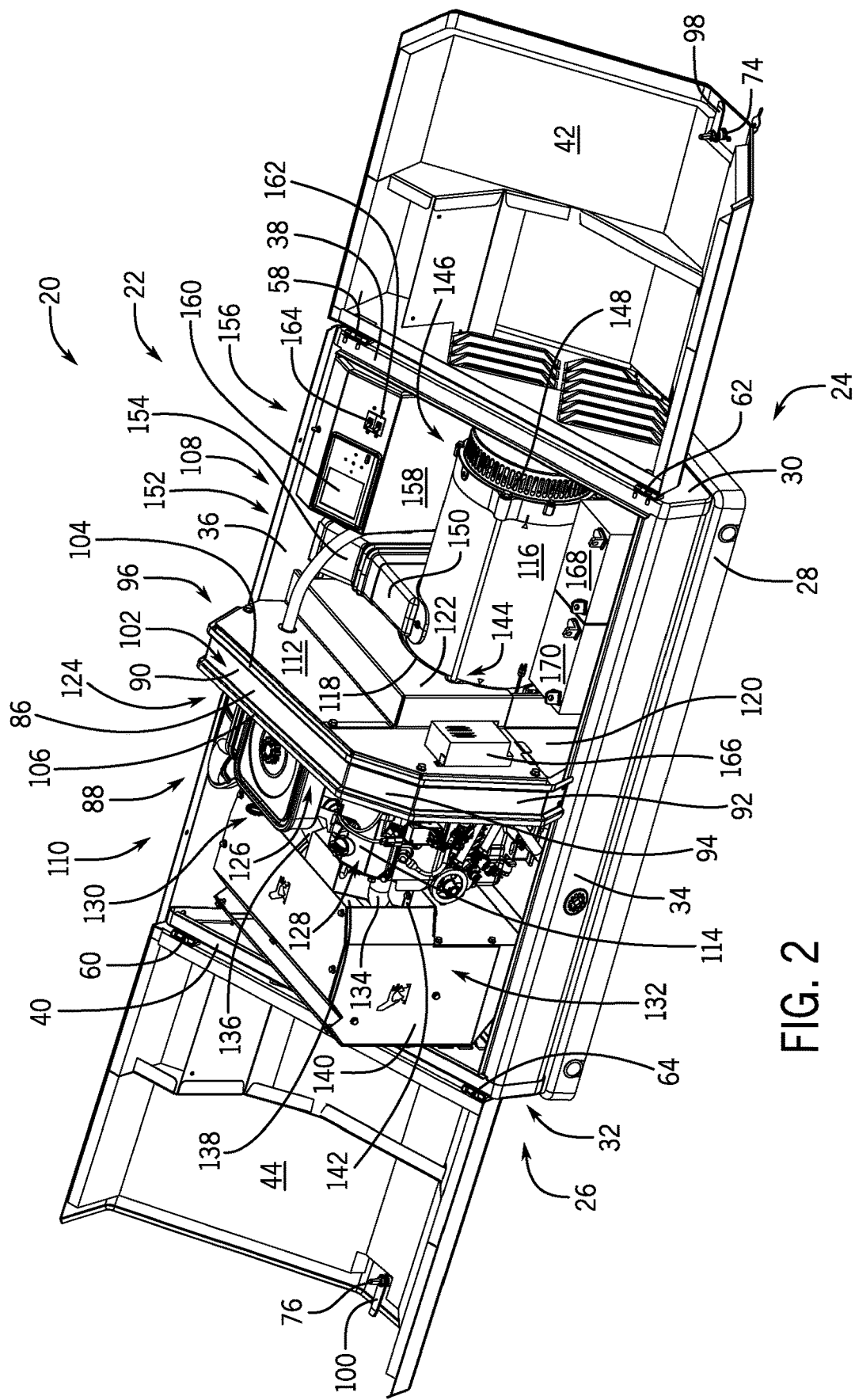
FIG. 2 is a perspective view from the right upper side of the electrical generator of FIG. 1 with left and right hoods opened to expose the electrical generator components within, according to an embodiment of the invention.

Referring now to FIG. 2, standby generator 20 is shown having the first hood 42 and the second hood 44 in an open position, in accordance with an embodiment of the invention. As indicated previously, the first hood 42 and the second hood 44 may be coupled to a respective sidewall 30, 32 using first hinge 58, 60 and second hinge 62, 64 with the first hinge near the back of the enclosure 22 and the second hinge near the front of the enclosure 22. The first hood 42 may be hinged to the enclosure 22 to rotate over a top of the first sidewall 30 and the second hood 44 may be hinged to the enclosure 22 to rotate over a top of the second sidewall 32. The first hood 42 and the second hood 44 may rotate about an upper or top edge 38, 40 of the respective sidewall 30, 32 beyond the first end 24 and the second end 26 of the enclosure 22 in a "gull wing" configuration for ease of access and serviceability to the generator. The "gull wing" configuration may allow the hoods 42, 44 to open without contacting a home, office, shop, business, or any other building requiring electricity located behind the standby generator 20.

The first hood 42 and the second hood 44 may open outwards beyond the respective first sidewall 30 and second sidewall 32 to expose a top and front entrance into the enclosure 22. The front wall 34 may be relatively short compared to the overall height of the enclosure 22 in part to allow for improved front access into the enclosure 22 when the hoods 42, 44 are open. The back wall 36 may be relatively tall compared to the front wall 34 with the first sidewall 30 and the second sidewall 32 having a forward sloping top edge 38, 40 from the back wall 36 to the front wall 34. The first hood 42 and the second hood 44 can then open upward and slightly forward as they rotate along the forward sloping top edge 38, 40 of each respective sidewall 30, 32. In other embodiments, the first hood 42 and the second hood 44 may rotate about a horizontal or vertical edge of a respective first sidewall 30 and second sidewall 32 between opened and closed positions.

FIG. 2 also shows a support arm 86 extending across a center of the enclosure 22 to support the first hood 42 and the second hood 44 in the closed position. The support arm 86 extends from the back wall 36 over the engine-generator set 88 to the front wall 34 in the enclosure 22. The support arm 86 may have a geometry that matches the first hood 42 and the second hood 44 to ensure the hoods close tightly against the support arm. Accordingly, the support arm 86 may have a top panel 90, a front panel 92, a front transition panel 94, and a rear transition panel 96 to match the first hood 42 and the second hood 44. The support arm 86 may also receive a latch 98, 100 from each handle 74, 76 to hold the first hood 42 and the second hood 44 closed.

The support arm 86 preferably has a channel or gutter 102 extending the length of the support arm to channel water off the front and back of the enclosure 22. The gutter 102 may be formed by raised outer edges that include a first rain seal 104 and a second rain seal 106 on opposite sides of the support arm 86. The first rain seal 104 and the second rain seal 106 each support and seal a respective hood 42, 44 in the closed position. The first rain seal 104 and the second rain seal 106 may also extend across portions of the back wall 36, front wall 34, and respective first and second sidewalls 30, 32 to seal around each perimeter entrance covered by the hoods 42, 44. The rain seals 104, 106 prevent rain from entering the enclosure 22 and may make the enclosure rain tight. Although some water may enter the enclosure 22 without negatively affecting the generator 20, it is desirable to prevent water from entering the electrical areas within the enclosure 22. The rain seals 104, 106 may make the electrical areas within the enclosure 22 rain tight.

In one embodiment of the invention, the enclosure 22 may comprise a multi-chamber standby generator enclosure comprising a plurality of chambers. The enclosure 22 may be separated into a right chamber 108 and a left chamber 110 by a partition wall 112, with the engine 114 and the alternator 116 mounted in separate respective chambers 108, 110 of the plurality of chambers. The partition wall 112 may extend from the support arm 86 to the base 28 of the enclosure 22, and also from the front wall 34 to the back wall 36 of the enclosure 22. The partition wall 112 may have an opening 118 through which the engine 114 mounted to the base 28 in the left chamber 110 can couple to drive the alternator 116 mounted to the base 28 in the right chamber 108. The partition wall 112 may comprise a main segment 120 aligned with the support arm 86 and an offset segment 122 spaced apart from the main segment in a direction opposite the engine 114. The offset segment 122 provides clearance for air to flow between the engine 114 and the partition wall 112 from an airflow opening 124 in the back wall 36.

FIG. 2 shows the engine 114 mounted in a horizontal crankshaft orientation with the crankshaft driving the alternator 116 through the opening 118 in the partition wall 112. The engine 114 may comprise an air-cooled engine having an engine cooling fan 126 at a front portion of the engine facing the partition wall 112. The engine fan 126 may draw a stream of air along the offset segment 122 of the partition wall 112 into the enclosure 22 through the airflow opening 124 in the back wall 36. The engine fan 126 preferably drives the stream of air over cylinders 128, 130 of the engine 114 in a direction toward the second end 26 of the enclosure 22. The engine 114 may also include an exhaust system 132 operatively coupled to the engine 114, the exhaust system 132 may comprise one or more exhaust pipes 134, 136 extending from the engine 114 in a direction downstream from the engine cooling fan 126, and a muffler 138 may be coupled to at least one of the one or more exhaust pipes 134, 136.

The muffler 138 may be positioned within a muffler box 140. The muffler box 140 can surround the muffler 138 managing heat transfer from the muffler 138 within the enclosure 22. The muffler box 140 may extend approximately from the engine 114 to the second sidewall 32 and approximately from the front wall 34 to the back wall 36 of the enclosure 22. The muffler box 140 may mount to the base 28 of the enclosure 22 and extend to a height above cylinders 128, 130 of the engine 114. The exhaust pipes 134, 136 may extend through an opening 142 into the muffler box 140, with the opening 142 positioned in an airflow path downstream from the engine fan 126. The muffler box 140 receives cooling air expelled from the engine 114 through the opening 142 and cools the muffler 138 by directing the cooling air over the muffler 138. The muffler box 140 may also direct the cooling air out of the enclosure 22 through vents in the second sidewall 32.

The alternator 116 may be driven by the engine 114 to produce electrical power for distribution from the standby generator 20. The alternator 116 may have a first end 144 coupled to the engine 114 and a second end 146 having an alternator cooling fan 148 on a side of the alternator 116 opposite the engine 114. An inlet air duct 150 is shown coupled to a side of the alternator 116 proximate the first end 144 in fluid communication with the alternator cooling fan 148. Accordingly, the alternator may comprise an alternator cooling fan 148 that draws air through the alternator 116 in a direction opposite the engine 114. In a preferred embodiment, the inlet air duct 150 extends to an opening 152 in the back wall 36 and includes a boot 154 sealing the air duct 150 to the opening 152. The alternator cooling fan 148 draws cooling air axially through the alternator 116 from the inlet air duct 150 and can drive the cooling air out of the enclosure 22 through vents in the first sidewall 30.

The standby generator 20 may include a control system 156 to operate the generator 20. The control system 156 may include a control box 158 to receive generator control components therein. The control box 158 is shown mounted behind the alternator 116 to the back wall 36 in the right chamber 108. The control system 156 may include a touch screen display 160 mounted on the control box 158, which may receive control inputs and/or display generator operating parameters. The control system 156 may include a first and a second circuit breaker 162, 164 having manual switches mounted on an outer surface of the control box 158. The circuit breakers 162, 164 can couple to electrical distribution lines from the alternator 116 such that the manual switches can be operated to control electrical distribution from the generator 20. The control system 156 may also include a battery charger 166 mounted on the partition wall 112 to charge a first battery 168 and a second battery 170 located on the base 28 in front of the alternator 116. The batteries 168, 170 can be used to crank the engine 114 for startup in the event of a power outage in the utility grid.

Figure 3:
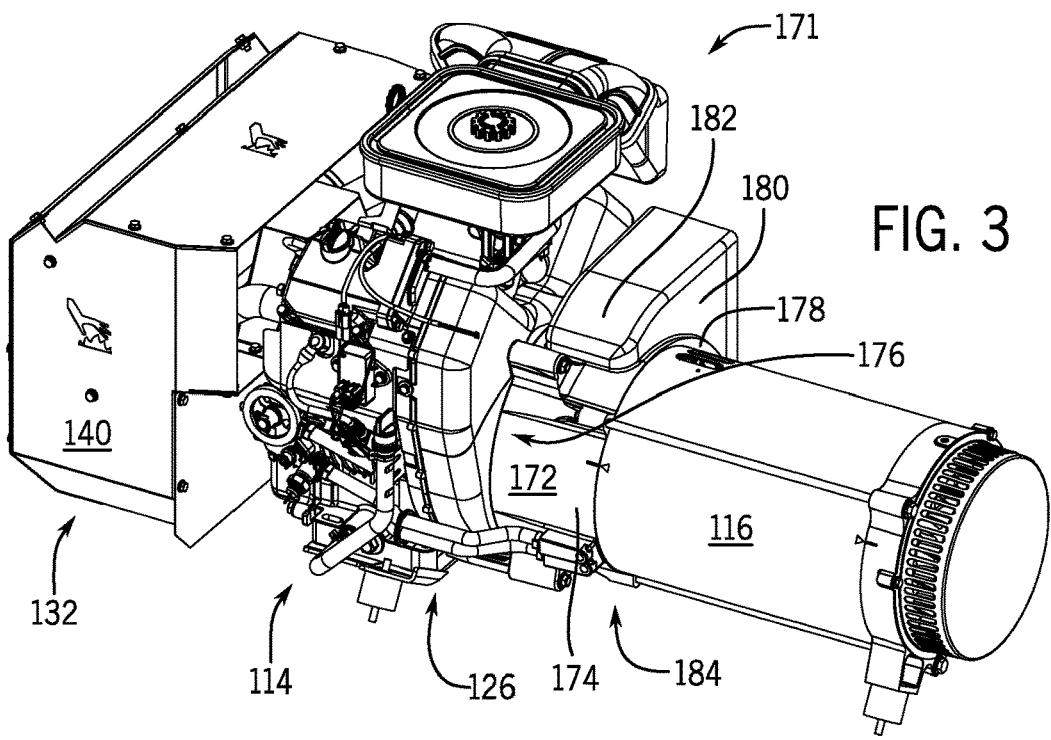
FIG. 3 is a perspective view showing components of the electrical generator of FIG. 1 from the right upper side of an alternator driven by an engine having a muffler positioned in a muffler box, according to an embodiment of the invention.
Figure 4:
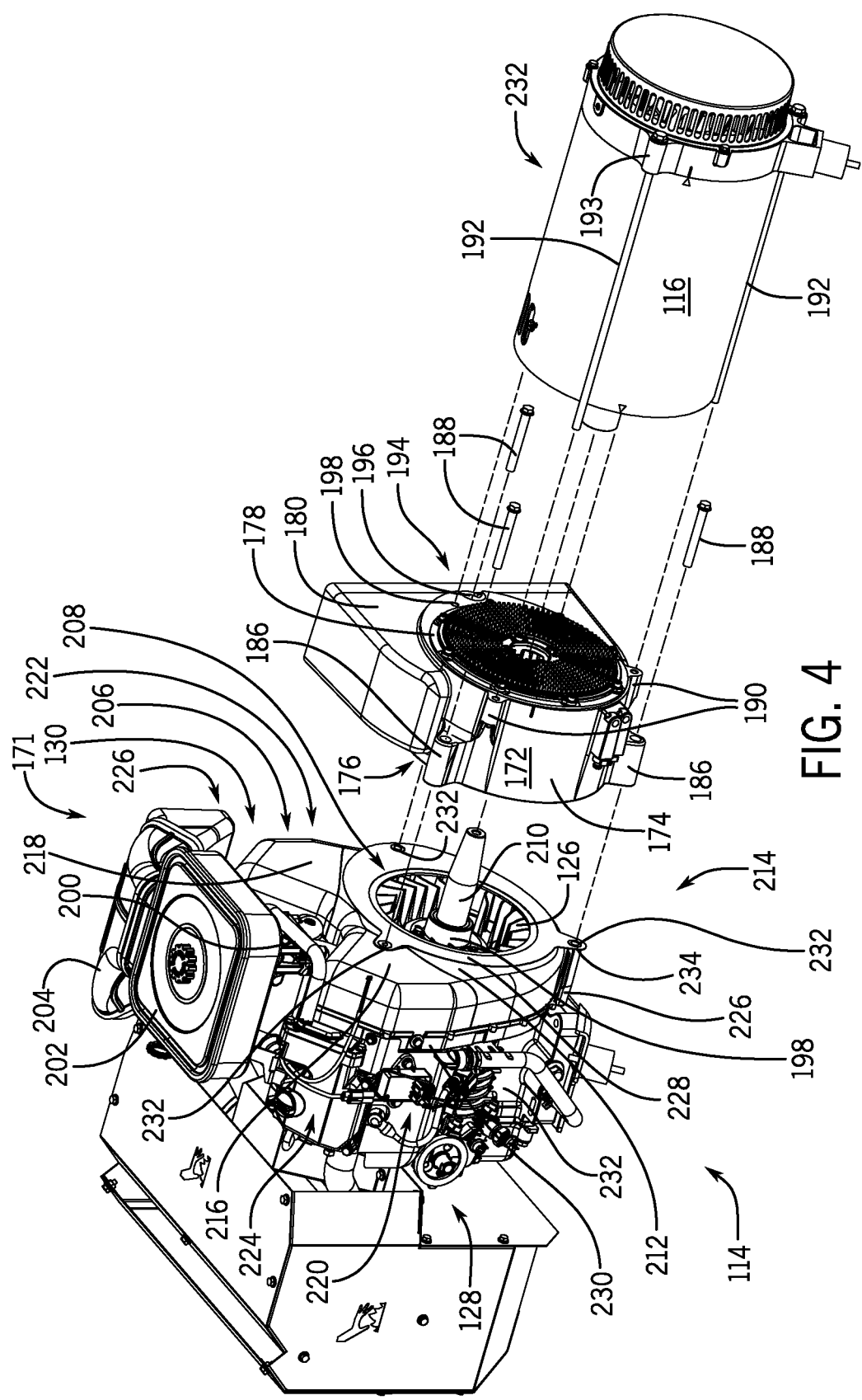
FIG. 4 is a perspective view similar to FIG. 3 having the alternator and an alternator adaptor exploded from the engine, according to an embodiment of the invention.

Referring now to FIGS. 3 and 4, the alternator 116 coupled to an engine assembly 171 comprising the engine 114 and engine cooling fan 126 is shown in assembled and exploded views, in accordance with an embodiment of the invention. In a preferred embodiment, an alternator adaptor 172 may couple the alternator 116 to the engine 114. The alternator adaptor 172 may have a main body comprising a cylinder 174. The main body 174 may have an engine mounting flange 176 at a first end of the cylinder 174 connected to the engine 114, and an alternator mounting flange 178 at a second end of the cylinder 174 connected to the alternator 116. The alternator adaptor 172 preferably includes openings through the engine mounting flange 176 and the alternator mounting flange 178 for passage of a shaft extending from the engine 114 to the alternator 116.

The alternator adaptor 172 may also include an inlet air duct 180 extending from a side of the alternator adaptor 172 between the engine mounting flange 176 and the alternator mounting flange 178. The inlet air duct 180 may be in fluid communication with the opening in the engine mounting flange 176 to provide airflow to the engine fan 126. The inlet air duct 180 has a generally rectangular cross-section having a width approximately equal to the length of the adaptor cylinder 174, and a height slightly larger than a diameter of the cylinder 174. The inlet air duct 180 can extend across a center of the cylinder 174 with a top surface 182 and a bottom surface 184 curving into the cylinder 174.

The alternator adaptor 172 may further include a first set of mounting projections 186 with openings that receive fasteners 188 coupling the engine 114 to the alternator adaptor 172, and a second set of mounting projections 190 with openings that receive fasteners 192 coupling the alternator 116 (via mounting projections 193 on alternator 116) to the alternator adaptor 172. For improved access to the fasteners 188, 192, the two sets of mounting projections 186, 190 may be offset from each other in a circumferential direction around the adaptor cylinder 174. The alternator adaptor 172 may have a support arm 194 extending across a midsection of the inlet air duct 180 from the engine mounting flange 176 to the alternator mounting flange 178. The support arm 194 can include an opening 196 for a fastener 188 coupling the alternator adaptor 172 to the engine 114. An opening 198 in the alternator adaptor 172 may be offset from the support arm 194 to receive a fastener 192 that couples the alternator 116 to the alternator adaptor 172.

As best shown in FIG. 4, the engine 114 may comprise a v-twin engine having two cylinders 128, 130. Each cylinder 128, 130 may receive a fuel and air mixture from a carburetor 200 located between or slightly above the cylinders 128, 130. The carburetor 200 mixes air with a liquid fuel, e.g. gasoline, and supplies the mixture to the cylinders 128, 130. The carburetor 200 can be coupled to receive air from an air filter 202 mounted on a top portion of the engine 114. The air filter 202 may receive air through an air duct 204.

FIG. 4 also shows a fan cover 206 mounted over the engine cooling fan 126 between the engine 114 and the alternator adaptor 172, the fan cover 206 preferably having an airflow opening 208 surrounding crankshaft 210 of the engine. The engine fan 126 preferably draws a stream of cooling air through the alternator adaptor 172 into the opening 208 in a main section 212 of the fan cover 206. Accordingly, the engine cooling fan 126 may be operatively coupled to the crankshaft 210 on a side of the engine 114 driving the alternator 116.

The fan cover 206 may be mounted over a front side 214 of the engine 114. The fan cover 206 can include the main section 212 covering the engine fan 126, and a first arm 216 and a second arm 218 each extending from the main section 212 to cover front side 214 of a respective cylinder 128, 130. For instance, the fan cover 206 is shown mounted over the engine cooling fan 126 and over sides of two cylinder blocks 220, 222 and sides of two cylinder heads 224, 226 of the cylinders 128, 130 facing the alternator 116. The engine fan 126 preferably drives cooling air from the main section 212 through the first arm 216 and the second arm 218 to the cylinders 128, 130.

An adaptor shield 228 may be provided on the front surface of fan cover 206 to accommodate mating of the alternator adaptor 172. Fasteners 188 can extend through openings in the adaptor shield 228 to mount the alternator adaptor 172 to a backplate 230 of an engine crankcase 232, with the backplate 230 positioned behind the engine fan 126 (i.e., between engine 114 and engine fan 126). The adaptor shield 230 is shown having three openings 232 for the fasteners 188, with one opening located in a tab 234 extending outward from the main section 212 of the fan cover 206.

Figure 5:
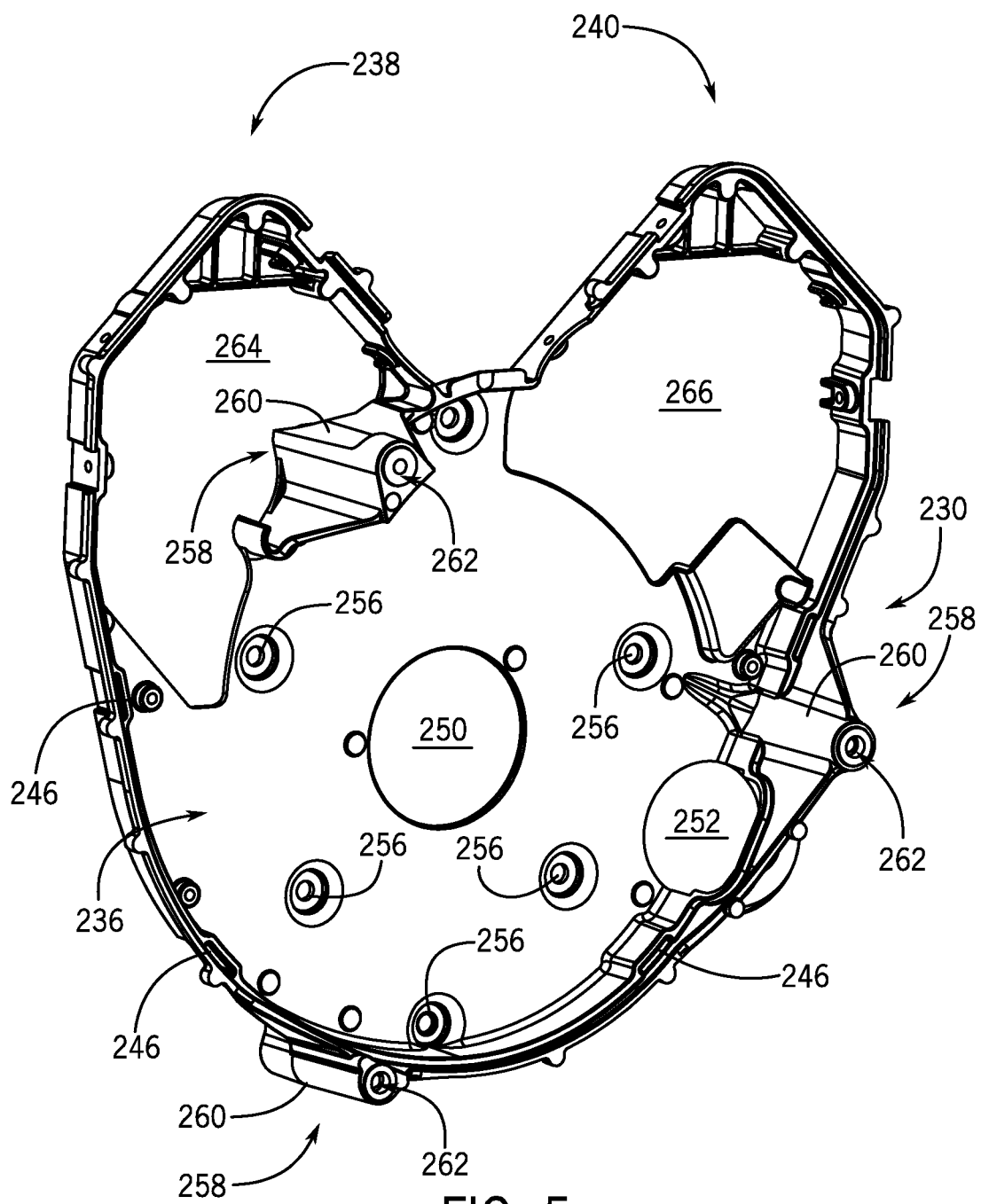
FIG. 5 is a perspective view of an engine backplate affixed to the engine of FIGS. 3 and 4, according to an embodiment of the invention.
Figure 6:
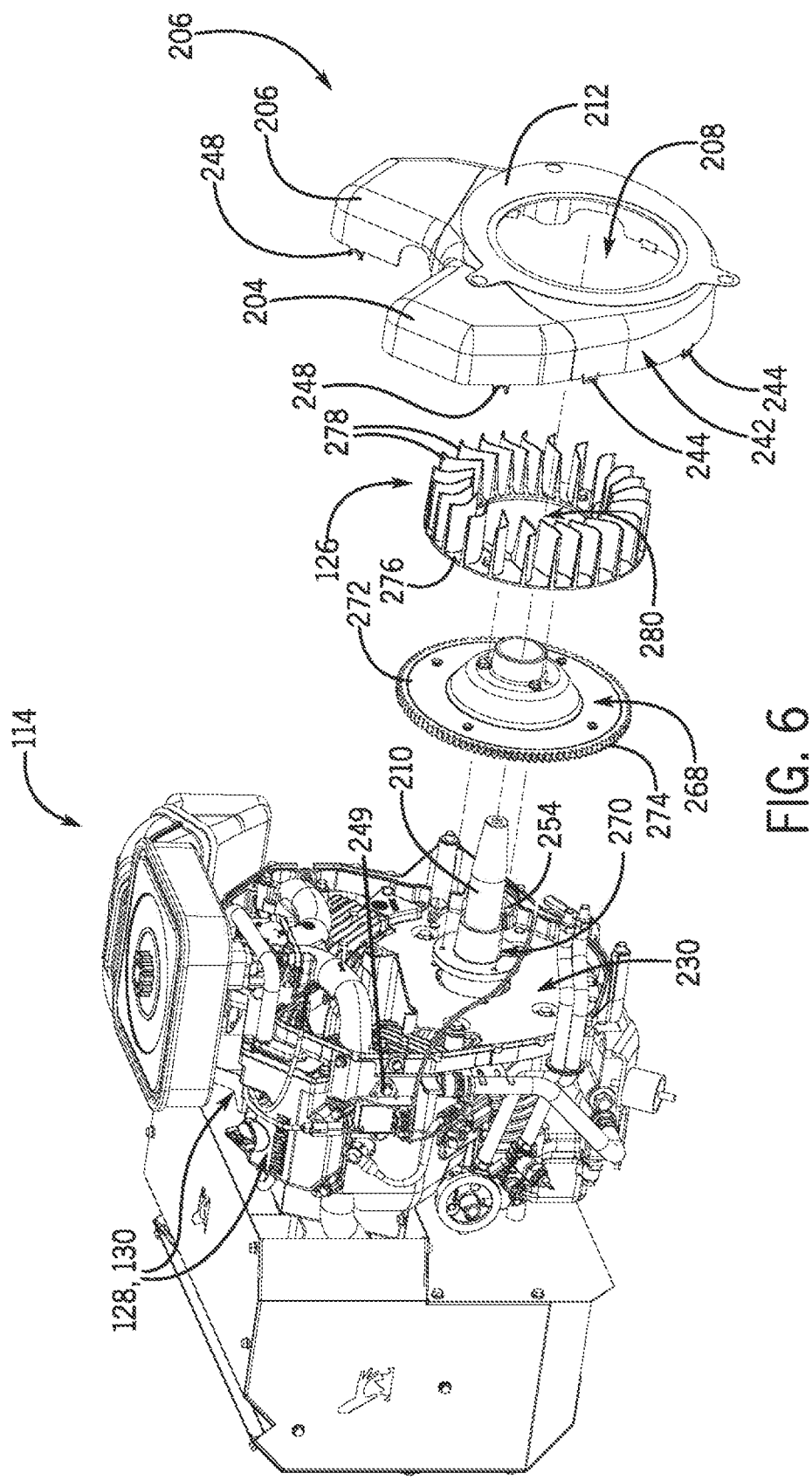
FIG. 6 is a perspective view similar to FIG. 3 having the fan cover, engine cooling fan, and fan base exploded from the engine, according to an embodiment of the invention.

Referring now to FIGS. 5 and 6, backplate 230 and the positioning thereof relative to engine 114 and alternator adaptor 172 is shown in greater detail, according to an embodiment of the invention. As seen therein, backplate 230 is shaped to generally correspond to a shape of fan cover 206 and thus backplate 230 includes a main section 236 and arms 238, 240 that extend out therefrom. The shape of backplate 230 allows for fan cover 206 to be easily secured thereto, with side portions 242 of the fan cover 206 (that extend around the main section 236 and both arms 238, 240 of the fan cover) coupling to the backplate 230. In an exemplary embodiment, the side portions 242 include a first plurality of tabs 244 that snap into receptacles 246 on backplate 230. The side portions 242 may also include a second plurality of tabs 248 each having an indented semicircle portion that receives a fastener 249 that clamps the second plurality of tabs 248 to the backplate 230. The engine cooling fan 126 is thus enclosed between the fan cover 206 and backplate 230, such that airflow from the cooling fan 126 is directed to the cylinders 142, 144.

As shown in FIG. 5, backplate 230 includes first and second openings 250, 252 that are formed in main section 236 to accommodate the crankshaft 210 and a starter motor 254 (FIG. 6), respectively. Additionally, a plurality of recessed bolt holes 256 are formed in main section 236 that receive fasteners (not shown) therein to secure the backplate 230 to the engine 114 (i.e., crankcase 232 of engine). While an arrangement of five bolt holes 256 are shown in backplate 230 in the illustrated embodiment, it is recognized that a greater or lesser number of bolt holes 256 could be provided for securing the backplate 230 to the engine 114. Backplate 230 further includes mounting locations 258 at which alternator adaptor 172 is secured to backplate 230, with a minimum of three mounting locations 258 being provided for securing alternator adaptor 172 to backplate 230. Each mounting location 258 comprises a boss 260 extending forward/outwardly from the engine 114, with each boss 260 including a threaded opening 262 formed therein to receive a respective fastener 188 from the alternator adaptor 172. The mounting locations 258 of backplate 230 correspond to the locations of the openings 232 in adaptor shield 228 and the openings in the first set of mounting projections 186 and the support arm 194 of alternator adaptor 172 to facilitate mounting of the alternator adaptor 172 to the backplate 230. Accordingly, the alternator adaptor 172 may be securely mounted to engine 114 via backplate 230, with the alternator 116 in turn being mounted to engine 114 via alternator adaptor 172 and centered relative to the engine 114 so as to align therewith in a desired arrangement.

As further shown in FIG. 5, the backplate 230 further includes a pair of air flow passages or "scoops" 264, 266 formed in arms 238, 240 that are provided to direct/guide air flow from the engine cooling fan 126 to engine 114. That is, backplate 230 seals air gaps behind the engine cooling fan 126 and guides an air flow therefrom out through the scoops 264, 266 to the cylinders 128, 130 of engine 114 to provide cooling thereto. Backplate 230 thus functions as an air flow guide within generator 20.

As shown in FIG. 6, a fan base 268 is positioned adjacent the backplate 230 that provides for mounting of the engine fan 126 to the crankshaft 210. To support the engine fan 126 on the engine 114, fan base 268 is mounted on the crankshaft 210 via a bushing 270 (e.g., flanged bushing). The fan base 268 is constructed to fit over bushing 270, with a plurality of fasteners (not shown) coupling the fan base 268 to the bushing 270. A circular plate 272 of fan base 268 receives the engine fan 126 thereon, with a plurality of fasteners being received within openings in the engine fan 126 in the circular plate 268 to mount the engine fan 126 to the fan base 268. A ring gear 274 can also couple to an outer radius of the circular plate 272, the ring gear 274 having gear teeth driven by starter motor 254.

The engine fan 126 may include an annular disc 276 with a plurality of fan blades 278 extending from one side of the annular disc 276. The fan blades 278 are shown extending from a center opening 280 to a perimeter of the annular disc 276. The annular disc 276 may include openings for fasteners to mount the engine fan 126 to the fan base 268, which may comprise a plurality of bolts. The crankshaft 210 can be inserted through the center opening 280 in the annular disc 276 such that the fasteners can secure the engine fan 126 to the fan base 268. The fan blades 278 can draw air through the opening 208 in the main section 212 of the fan cover 206 and drive the air through the two arms 204, 206 of the cover 206 to each respective cylinder 128, 130, with the air flow from the engine fan 126 directed by backplate 230 to the engine cylinders 128, 130 via the openings/scoops 264, 266 in arms 238, 240 of backplate 230.

Figure 7:
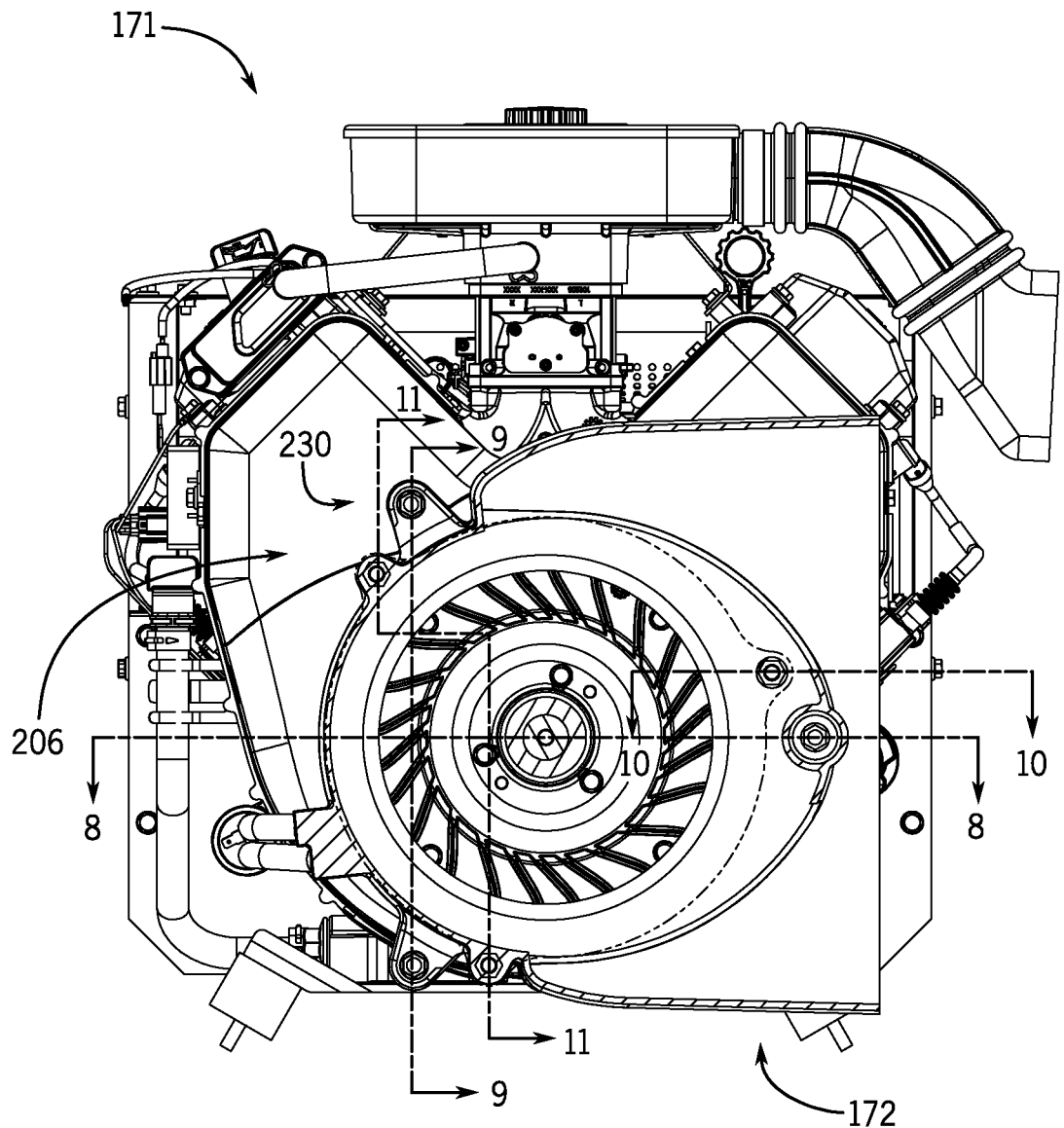
FIG. 7 is a cross-sectional view taken along line 7-7 of FIG. 3 showing a portion of an alternator adaptor coupled to an engine of the generator via engine backplate, according to an embodiment of the invention.

Referring now to FIGS. 7-11, various front and cross-sectional views of engine assembly 171 and alternator adaptor 172 are provided that better illustrate mounting of the alternator adaptor 172 and fan cover 206 to backplate 230 and of alternator 116 to alternator adaptor 172. FIG. 7 shows a front view of engine assembly 171 and alternator adaptor 172 that illustrates locations where fasteners are inserted to secure the alternator adaptor 172 to backplate 230 and to secure the alternator 116 to alternator adaptor 172—with various cross-sectional views being taken off of FIG. 7 in FIGS. 8-11 that better illustrate coupling of the components.

Figure 8:
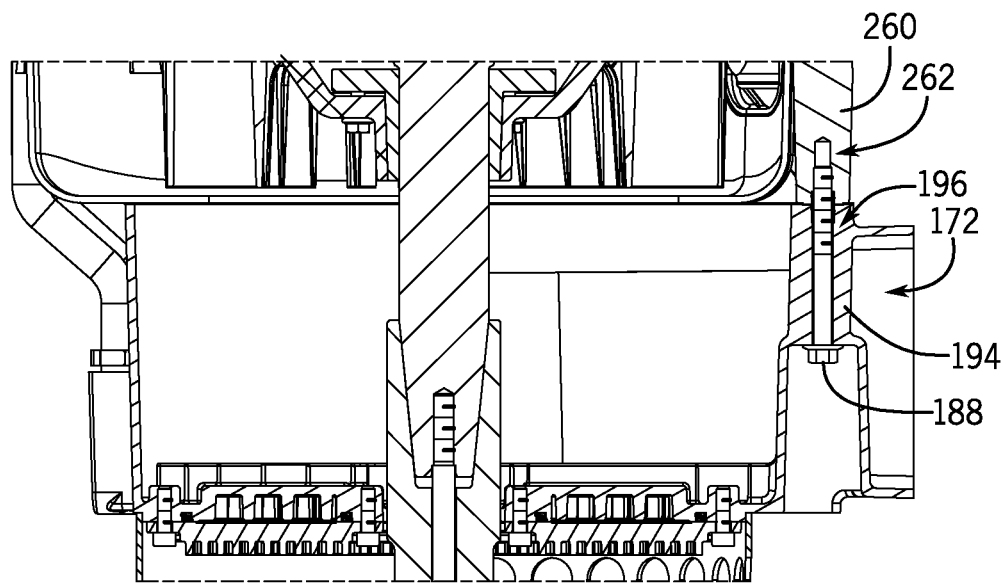
FIG. 8 is a partial cross-sectional view taken along line 8-8 of FIG. 7 showing the alternator adaptor coupled to the backplate, according to an embodiment of the invention.
Figure 9:
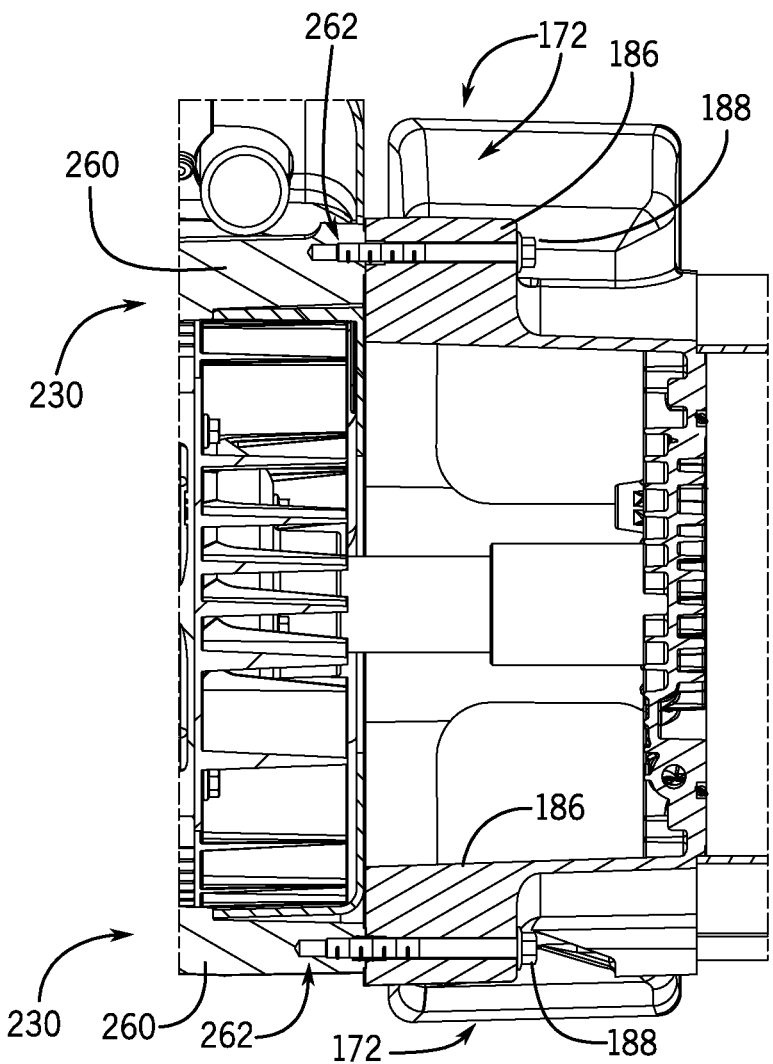
FIG. 9 is a partial cross-sectional view taken along line 9-9 of FIG. 7 showing the alternator adaptor coupled to the backplate, according to an embodiment of the invention.
Figure 10:
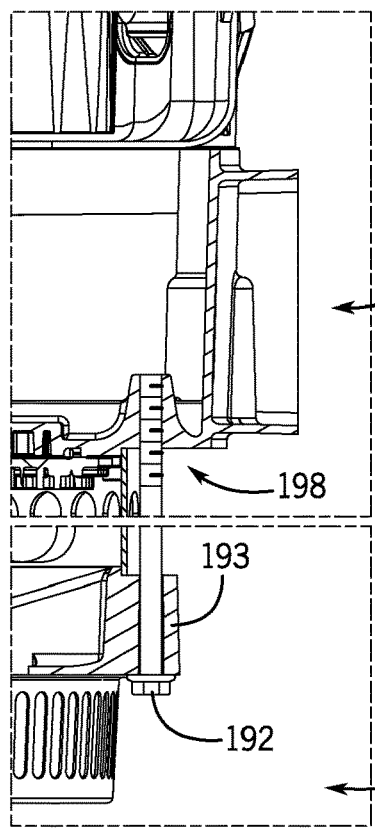
FIG. 10 is a partial cross-sectional view taken along line 10-10 of FIG. 7 showing the alternator coupled to the alternator adaptor, according to an embodiment of the invention.
Figure 11:
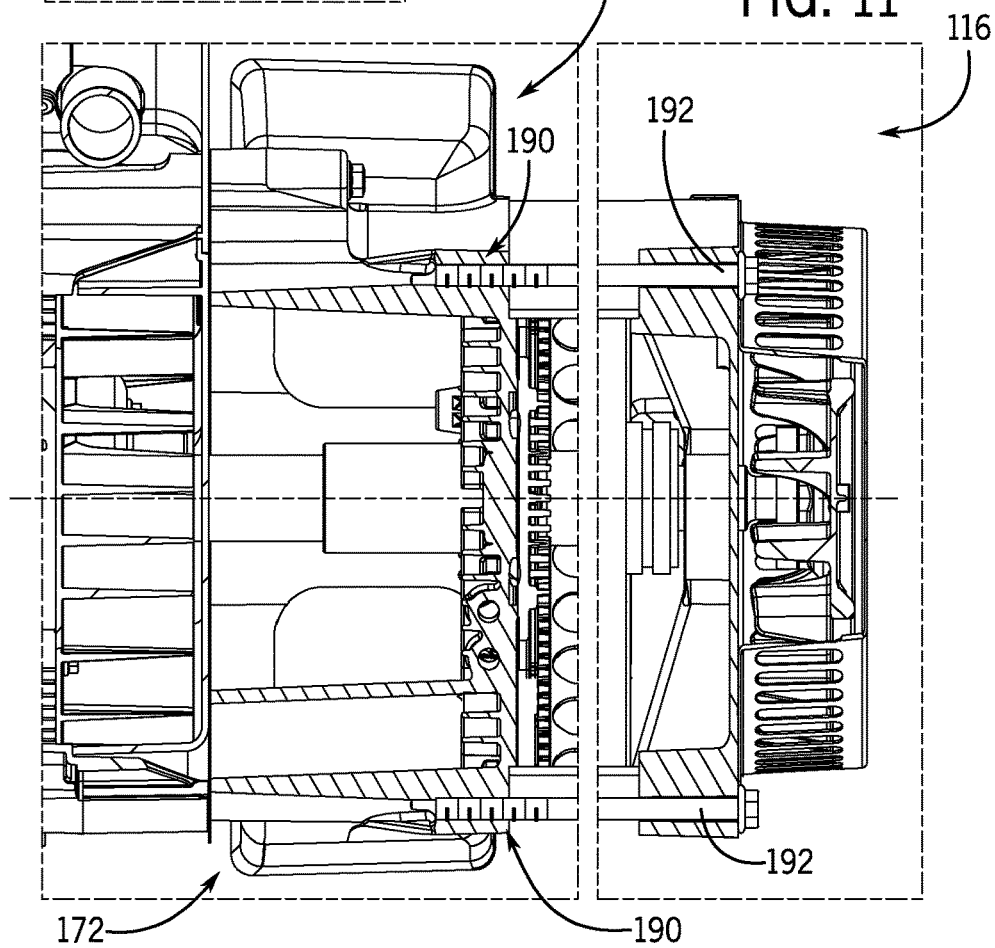
FIG. 11 is a partial cross-sectional view taken along line 11-11 of FIG. 7 showing the alternator coupled to the alternator adaptor, according to an embodiment of the invention.

FIGS. 8 and 9 illustrate coupling of the alternator adaptor 172 to backplate 230, with the mounting locations 258 on backplate 230 (i.e., bosses 260) shown aligning with the first set of mounting projections 186 (FIG. 9) and the support arm 194 (FIG. 8) of alternator adaptor 172. Fasteners 188 are inserted through openings in mounting projections 186 and support arm 194 and into threaded openings 262 of bosses 260 to facilitate mounting of the alternator adaptor 172 to the backplate 230. FIGS. 10 and 11 illustrate coupling of the alternator adaptor 172 to alternator 116, with the second set of mounting projections 190 (FIG. 11) and opening 198 (FIG. 10) on alternator adaptor 172 shown aligning with mounting projections 193 of alternator 116. Fasteners 192 are inserted through openings in mounting projections 190 and opening 198 and into threaded openings of mounting projections 193 to facilitate mounting of the alternator adaptor 172 to the alternator 116.

Beneficially, embodiments of the invention provide an engine backplate that serves as centering tool for an alternator-engine arrangement, as well as functions as an air flow guide for directing air from an engine cooling fan to an engine. The engine backplate is constructed to be fastened to the engine and to accept thereon (i.e., be fastened thereto) both a fan cover and an alternator adaptor. The alternator adaptor is coupled to the backplate, with the alternator in turn being coupled to the alternator adaptor, so as to provide for mounting of the alternator to the engine and centering of the alternator relative to a crankshaft driven by the engine and that drives the alternator. The engine backplate, in combination with the fan cover affixed thereto and positioned about the engine cooling fan, guides an air flow generated by the cooling fan to the engine, with openings/scoops in the backplate directing the air flow from the cooling fan to cylinders of the engine.

Therefore, according to one embodiment of the invention, an engine assembly includes an engine having a crankshaft that is caused to rotate response to a firing of the engine, a backplate affixed to the engine and comprising one or more air flow passages formed therethrough, and an engine cooling fan operatively coupled to the crankshaft so as to be rotated by the crankshaft, the engine cooling fan coupled to the crankshaft on a side of the backplate opposite the engine. The engine assembly also includes a fan cover mounted over the engine cooling fan and secured to the backplate, the fan cover including an opening through which an air flow is provided to the engine cooling. The backplate and the fan cover collectively form an air guide that directs a flow of cooling air generated by the engine cooling fan through the one or more air flow passages of the backplate and to the engine.

According to another embodiment of the invention, a backplate for an internal combustion engine includes a main section having an opening therein sized to receive an engine crankshaft therethrough, a pair of arms extending off from the main section and each having formed therein an air flow passage, and a plurality of bosses extending outwardly from the main section to provide mounting locations to the backplate, each boss including a threaded opening formed therein configured to receive a fastener.

According to yet another embodiment of the invention, a generator includes an engine, a backplate affixed to the engine, an alternator driven by the engine via a crankshaft extending from the engine to the alternator, and an alternator adaptor positioned between the engine and the alternator and affixed to the backplate. The backplate provides a structural support to connect the alternator to the engine, via the alternator adaptor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator comprising:
   an engine;
   a backplate affixed to the engine;
   an alternator driven by the engine via a crankshaft extending from the engine to the alternator;
   an alternator adaptor affixed to the backplate and coupling the alternator to the engine; and
   an engine cooling fan operatively coupled to the crankshaft so as to be rotated by the crankshaft, the engine cooling fan coupled to the crankshaft on a side of the backplate opposite the engine;
   wherein the backplate comprises:
      a main section having an opening therein sized to receive the crankshaft therethrough; and
      a pair of arms extending off from the main section, with each of the pair of arms having an air flow passage positioned between the engine cooling fan and the engine.

2. The generator of claim 1 wherein the backplate further comprises a plurality of bosses extending outwardly in a direction away from the engine, each boss including an opening formed therein to receive a fastener that mounts the alternator adaptor to the backplate.

3. The generator of claim 2 further comprising a fan cover mounted over the engine cooling fan and secured to the backplate, the fan cover including an opening through which an air flow is provided to the engine cooling fan;
   wherein each boss of the plurality of bosses is positioned generally about a perimeter of the main section of the backplate and outside a perimeter of the fan cover.

4. The generator of claim 1 further comprising a fan cover mounted over the engine cooling fan and secured to the backplate, the fan cover comprising:
   a main section having an airflow opening surrounding the crankshaft through which an air flow is provided to the engine cooling fan; and
   a pair of arms extending off from the main section of the fan cover;
   wherein each of the pair of arms of the fan cover couples to a respective one of the pair of arms of the backplate to direct a flow of cooling air generated by the engine cooling fan through a respective one of the air flow passages to the engine.

5. The generator of claim 1 further comprising a fan cover mounted over the engine cooling fan and secured to the backplate, the fan cover comprising:
   an opening through which an air flow is provided to the engine cooling fan; and
   a plurality of tabs that mate with the backplate to secure the fan cover to the backplate, the plurality of tabs comprising at least one of:
      a first plurality of tabs that snap into receptacles formed on the backplate; and
      a second plurality of tabs each having an indented semicircle portion that receives a fastener that clamps the second plurality of tabs to the backplate.

* * * * *